United States Patent [19]

Lemons

[11] 4,221,619
[45] Sep. 9, 1980

[54] SPONGE CARRIER ADHESIVE PROCESS

[75] Inventor: Carl R. Lemons, Westminster, Calif.

[73] Assignee: McDonnell Douglas Corporation, Long Beach, Calif.

[21] Appl. No.: 963,296

[22] Filed: Nov. 24, 1978

[51] Int. Cl.$^2$ .......................... B29B 3/00; B09B 3/00; B29G 5/00; C09J 5/00

[52] U.S. Cl. ........................................ 156/71; 156/80; 156/306.9; 156/311; 156/313; 264/28; 264/137; 264/348

[58] Field of Search ................ 156/80, 242, 245, 306, 156/309, 311, 313, 71; 264/54, 28, 137, 345, 348; 428/311; 114/44

[56] References Cited

U.S. PATENT DOCUMENTS

| | | | |
|---|---|---|---|
| 3,697,630 | 10/1972 | Yoshino | 156/80 |
| 3,867,221 | 2/1975 | Chant | 428/311 |
| 3,915,783 | 10/1975 | Goppel et al. | 156/245 |
| 3,960,639 | 6/1976 | Kudo | 156/313 |
| 3,996,092 | 12/1976 | Sarazin et al. | 156/313 |
| 4,042,746 | 8/1977 | Hofer | 156/309 |

Primary Examiner—John T. Goolkasian
Assistant Examiner—L. Falasco
Attorney, Agent, or Firm—Max Geldin; John P. Scholl; Walter J. Jason

[57] ABSTRACT

A flexible, e.g. polyurethane, open cell foam sheet is impregnated with a controlled amount of a liquid polymerizable resin system which cures at ambient temperature, and the resin impregnated sheet is immediately chilled at a suitably reduced temperature, e.g. 40° F. or below, to arrest polymerization or hardening. The resulting resin impregnated sheet is stored at such reduced temperature. When needed for adhesive bonding the chilled resin impregnated sheet, cut to the desired pattern or size, is applied between the surfaces of objects to be bonded, e.g. fiber reinforced polyurethane insulation blocks and plywood strips, or such insulation blocks and the steel hull of a liquid natural gas (LNG) container or marine tanker. With or without the application of bonding pressure, as the temperature of the resin impregnated sheet rises to ambient temperature, curing of the resin in the sheet to the solid state takes place, and bonding of the adjacent surfaces of the objects occurs, substantially without extrusion of any excess resin from the sheet, the open cell foam sheet containing the cured resin forming an integral part of the resulting bondline.

40 Claims, 6 Drawing Figures

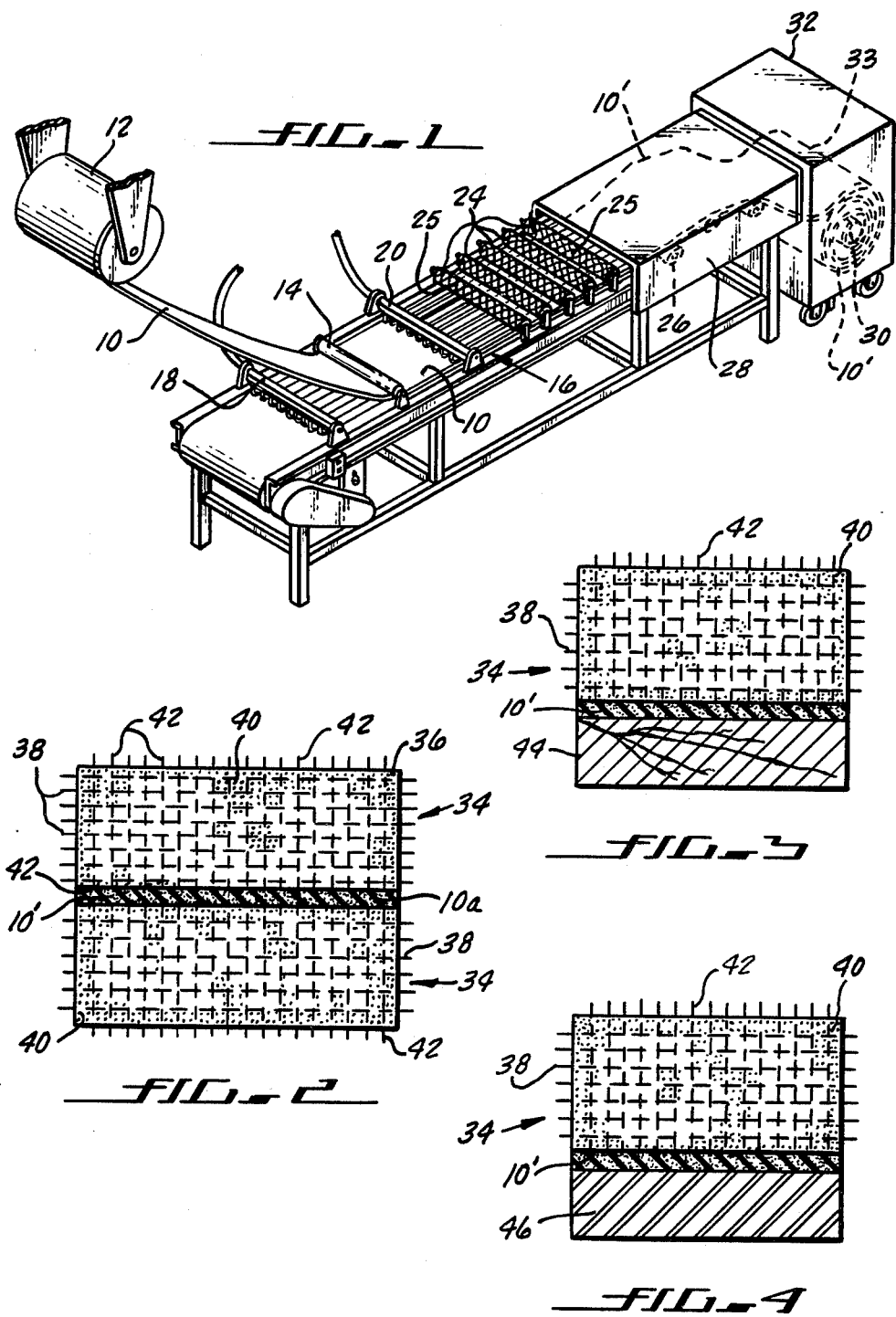

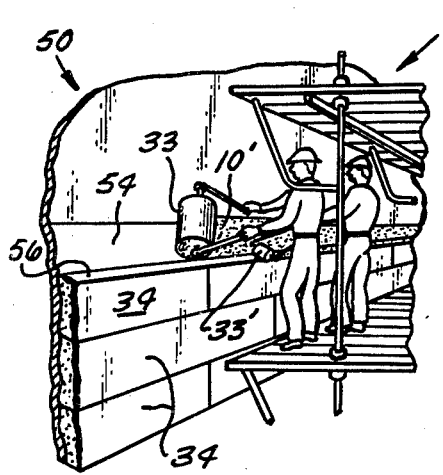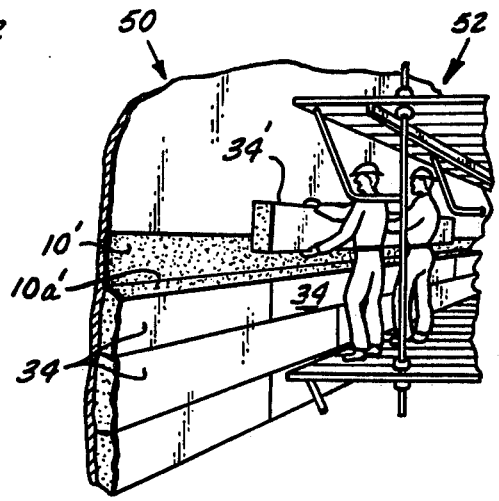

SPONGE CARRIER ADHESIVE PROCESS

BACKGROUND OF THE INVENTION

The present invention relates to a process for adhesively bonding together the surfaces of objects such as resin, wood and metal parts, and is particularly concerned with novel procedure for carrying out such bonding using an open-cell sponge or foam carrier containing a curable resin.

The basic problem with handling all liquid adhesives that are formulated to cure at ambient temperature is that the adhesive resin must be mixed with its hardener, or catalyst, and quickly spread over the surfaces to be bonded and pressed together before the adhesive begins to gel, or before expiration of the working life period. The spreading methods may involve scrapers, paddles or sprinkler nozzles or other similar techniques that result in non-uniform deposits of adhesive and result in smearing liquid adhesive over areas that should not receive adhesive, including the floor. Currently used liquid, room temperature curing adhesive mixture must be "filled" or mixed with powders such as Cabosil mineral powder to control dripping, sagging or migration when deposited in thickness greater than about 0.015 inches. The adhesive mixing equipment used for intermittant bonding operations must be located in the immediate proximity of the bonding operation, such as inside the hold of an LNG marine tanker, where the cleanup of the equipment and spillage of ingredients is likely to contaminate other components of the insulation system.

Various composites or thermosetting resin laminates have been prepared employing a sheet having an open-cell structure and containing a curable thermosetting resin. Thus, U.S. Pat. 4,042,746 to Hofer discloses a composite structure comprising a rigid closed-cell foam core element to which is bonded an initially resilient open-cell foam material and a layer of a reinforcing material, wherein the sandwich is placed in a mold and a compression load is applied and excess resin is extruded outwardly from the open-cell foam and the resin is heat cured to bond the high strength reinforcing material to the rigid closed-cell core element. However, such a system is not applicable for bonding large amounts of reinforced foam material at ambient temperature, for example, for bonding fiber reinforced foam insulation blocks together to provide a foam insulation layer in a ship or tanker for transporting liquid natural gas at cryogenic temperatures, or for bonding such foam insulation blocks to the inner ship hull, at the ship site.

U.S. Pat. Nos. 3,915,783, to Goppel et al and 3,930,919 to Chant et al disclose processes for producing a thermosetting resin laminate comprising impregnating an open-cell sheet with a thermosetting resin, applying a fibrous reinforcing layer to at least one side of the impregnated sheet, compressing the foam sheet and reinforcing layers to the extent that resin is expelled from the sheet into the fibrous reinforcing layer, and curing the resin in the sheet and reinforcing layer by heat curing in a mold at elevated temperature.

U.S. Pat. No. 3,193,437 to Schafer et al has a similar disclosure relating to the production of molded laminated articles.

U.S. Pat. No. 3,193,441 to Schafer discloses a laminate article prepared by impregnating a thermosetting resinous composition in liquid form into a resilient sheet of flexible foamed polyurethane having open connected cells to substantially fill such cells with resin, the impregnated sheet of foamed polyurethane is compressed between molding plates, and the thermosetting resinous composition is heat cured to a hardened condition while the impregnated sheet of foamed polyurethane is maintained under compression.

U.S. Pat. No. 3,697,630 to Yoshino discloses bonding a resinous body in a cavity, which comprises outgassing and freezing a body of normally liquid uncured resinous material to form a voidfree body, fitting the frozen body into a cavity and thereafter thawing the frozen resinous material and curing same to provide a bond to the walls of the cavity.

SUMMARY OF THE INVENTION

One object of the present invention is the provision of simple procedure for adhesively bonding surfaces together, while eliminating the handling and use of liquid adhesives.

Another object of the invention is to provide novel procedure for adhesive bonding of surfaces employing a non-liquid carrier for the adhesive.

A still further object is to provide a bonding procedure of the type noted above, employing a sponge or foam carrier containing the adhesive, and which can be readily stored and used when needed at the bonding site.

Yet another object is the provision of novel bonding procedure as noted above, employing a sponge or foam carrier containing a thermosetting adhesive resin system which is curable at room temperature, and which can be stored at reduced temperature substantially without setting up, and which when applied between surfaces of objects to be bonded can be readily cured at room temperature to form an integral bond, without the extrusion of excess resin out of the sponge carrier.

The above objects and advantages are achieved according to the invention by impregnating an open-cell sponge carrier, preferably in the form of an open-cell flexible or resilient foam, e.g. polyurethane foam, sheet with a controlled or predetermined amount of a liquid polymerizable or thermosetting resin system which is capable of curing at ambient temperature, and then quickly reducing the temperature of the resin impregnated sheet sufficiently as by chilling or freezing to arrest the polymerizing or curing (chemical hardening) action of the resin system. The chilled or frozen resin impregnated sheet containing the inactivated resin system can then be stored at such reduced temperature to prevent setting up, until such time as the sheet is to be used for bonding.

When needed for adhesive bonding, the chilled resin impregnated sponge carrier or sheet containing the uncured resin, which can be cut to a desired pattern or size either before or after chilling or freezing, can be placed directly on or between the surfaces of objects to be bonded, e.g. fiber reinforced polyurethane foam insulation and the walls of LNG containment vessels, comprised of plywood, concrete or steel, and with or without the application of light bonding pressure, as the temperature of the resin impregnated sheet rises approximately to ambient temperature, and the resin again becomes liquid, curing the resin in the sheet to the solid state, causing bonding of the adjacent surfaces of the objects to take place, substantially without extrusion of any excess resin from the resin impregnated sheet. Only contact pressure or light bonding pressure, e.g. of the order of about 10 psi need be applied, and as such light bonding pressure is applied to make contact with the faying surfaces of the objects to be bonded, the flexible foam sheet, containing the liquid resin now raised to ambient temperature, will compress readily to become an integral part of the resulting bondline when the resin cures at ambient temperature to the solid state.

The sponge or open-cell foam carrier sheet employed in the invention process is capable of containing liquid adhesive resin without dripping or migration and can be used to provide bondline thicknesses of less than 0.005" to over 0.2", but which generally range between the foregoing values.

In a broad sense the invention provides an adhesive bonding process which comprises impregnating a sponge carrier with a predetermined amount of a liquid polymerizable resin system which is capable of curing at ambient temperature, quickly reducing the temperature of said resin impregnated sponge carrier sufficiently to arrest the curing of said resin system, maintaining said resin impregnated sponge carrier at said reduced temperature for a period of time, placing at least a portion of said last mentioned sponge carrier impregnated with resin between objects to be bonded together, permitting the temperature of said resin impregnated sponge carrier to rise approximately to ambient temperature, causing the resin system to cure and to bond the adjacent surfaces of said objects, substantially without extrusion of any excess of said resin system from the resin impregnated sheet, the resulting sponge carrier containing cured resin forming a controlled thickness bondline between said bonded objects.

The invention concept permits the liquid adhesive resin to be mixed with its curing agent or hardener, and dispersed uniformly and accurately into the open-cell sponge carrier, e.g. polyurethane foam sheet, at a centrally located remote area. Following storage at reduced temperature, e.g. ranging from about 0° F. to about 40° F. ($-18°$ C. to about $+4°$ C.), the chilled or frozen resin impregnated foam sheet can then be transferred to the various bonding areas where bonding is being carried out, and held at the site in cold boxes until ready for use. When raised to ambient temperature of about 20° C., the adhesive in the impregnated foam sheet will return to liquid state and then proceed to cure, with only a slight reduction in the work life that would normally be expected, and will cure at ambient temperature in substantially the same time period as an initial mixture of the same resin and hardener would cure, without having been initially chilled according to the present invention. The sponge carrier adhesive sheet can be cut to pattern accurately and positioned over the surfaces to be bonded without smearing or dripping liquid adhesive over areas that should remain clean. The sponge carrier adhesive system of the invention can be used for bonding objects of plastic, wood or metal to each other.

Particularly where the sponge carrier adhesive sheet, especially the open-cell resin impregnated polyurethane foam sheet is employed in bonding operations in shipyards, an important application according to the present invention, the elimination of the use of the above noted mineral filler in the resin adhesive, previously employed to control dripping or migration of the adhesive, and the wide tolerance in resin viscosity that the sponge carrier will tolerate, will substantially relieve the problem attendant to the use of liquid adhesives in shipyard applications. The invention concept and process also avoids the problem of supervising and training of shipyard personnel to handle adhesive mixing machinery with spreading nozzles and conveyers at many different bonding sites within a ship, whereas the resin impregnated sponge carrier according to the present invention can be manufactured at a single central remote site, and the chilled resin impregnated sponge carrier sheets can be channeled readily thereafter to the specific bonding sites within the ship. In addition, the inherent cleanliness and accuracy of positioning the sheets of sponge or open-cell foam filled with adhesive on components to be bonded inside the ship's hold provides greater reliability in bonding at a much lower cost.

Thus, the invention process is particularly adapted and designed for ambient temperature curing adhesives which are required for bonding insulation, particularly fiber reinforced polyurethane insulation, inside large marine vessels for transporting low temperature cryogenic fluids, especially liquid natural gas (LNG).

THE DRAWINGS

The invention will be described in greater detail below, taken in connection with the accompanying drawing wherein:

FIG. 1 is a schematic illustration of procedure for impregnating a sponge carrier with a liquid ambient temperature curing thermosetting bonding resin and chilling the resin impregnated sponge carrier to prevent polymerization and curing of the resin;

FIG. 2 illustrates bonding of fiber reinforced polyurethane blocks by means of the sponge carrier adhesive element according to the invention;

FIG. 3 illustrates bonding of a block of fiber reinforced polyurethane foam to plywood by means of the sponge carrier adhesive of the invention;

FIG. 4 illustrates bonding of fiber reinforced polyurethane foam to steel employing the sponge carrier adhesive according to the invention;

FIG. 5 illustrates application of a chilled resin impregnated sheet of polyurethane foam to the inside surface of the steel hull of a liquid natural gas (LNG) marine tanker; and FIG. 6 illustrates application of blocks of fiber reinforced (3-D) polyurethane foam insulation for bonding to the inside surface of the steel hull and to other blocks of such foam insulation, via the resin impregnated foam sheets applied in FIG. 5.

DETAILED DESCRIPTION OF PREFERRED EMBODIMENTS

Referring to FIG. 1 of the drawing, a sponge carrier 10 is fed from a stock roll 12, beneath a guide roll 14 to a conveyer assembly indicated at 16. The sponge carrier 10 is preferably in the form of a sheet, e.g. of about ⅛" to about ¼" thick, having an open-cell structure which acts as a reservoir for the resin. Such sheet having the open-cell structure should be compressible, flexible and readily wettable by the liquid resin, and must possess an open connected cellular structure to allow essentially unobstructed passage of the liquid resin throughout the sheet. The material of which the sponge carrier or sheet is composed should be such that it does not react with the thermosetting resin with which the sheet is to be impregnated. In preferred practice a foam sheet which has an open-cell structure is employed, particularly an open-cell resilient polyurethane sheet. Polyurethanes of the polyester and polyether types can be employed, particularly the polyether type due to its ready availability. Instead of polyurethane flexible open-cell foam, scrim cloth or fiberglass can be used or other open-cell elastomers, such as sponge rubber or latex, cellulose foams, and the like. The invention will be further described chiefly in relation to the use of a polyurethane open-cell resilient foam sheet for resin impregnation.

Prior to passage of the polyurethane open-cell foam sheet 10 beneath the idle roll 14, the lower surface of the sheet is sprayed or sprinkled with a thermosetting liquid bonding resin via the dispenser 18. The thermosetting liquid resins suitable for use in the invention process are those which are curable at room or ambient temperature (about 20° C.). These include, for example, liquid polyurethane, liquid polyester and liquid epoxy resins. Liquid melamine and silicone resins also can be employed. The thermosetting resins are converted to the cured or thermosetting form by cross-linking processes generally accomplished by the addition of a suitable ambient or room temperature curing agent, with or without addition of curing catalysts or accellerators, to the resin. Suitable ambient or room temperature curing agents for the above resins are well known to those skilled in the art. Polyurethane resin adhesives are formed by reaction of a polyol with an isocyanate such as diphenylmethane-4,4'-diisocyanate, (MIDI), e.g. as disclosed in "Polyurethane" by B. A. Dombrow, Reinhold, 1957, Chapter 7. Of the epoxy resins, particularly preferred are the liquid glycidyl polyethers of polyhydric phenols such as the diglycidyl ether of bisphenol A (BPA) made by reacting epichlorohydrin and BPA in the presence of caustic. The preferred polyesters are the unsaturated polyesters generally known to be used in the laminating art.

Proper ambient temperature hardening or curing agents for the liquid polyurethanes are non-chlorinated amines. For epoxies suitable ambient temperature curing agents are aliphatic amines, particularly aliphatic polyamines, or polyamides, and for polyesters, for example, methylethyl ketone peroxide is used. Proper curing agents for epoxy and polyester resins are well known to those skilled in the art. See, for example, chapters 5–12 of the "Handbook of Epoxy Resins", Lee and Nevelle, McGraw Hill, Inc. 1967, for curing agents and mechanisms of cure for epoxy resins, and chapter 6 of Rineholt Plastic Application Series, polyester resins, Lawrence, Rinehold Publishing Corp., 1967, for curing agents and mechanisms of cure for polyester resins.

The polyurethane sheet 10, following sprinkling of its undersurface with liquid resin adhesive, and passage of the sheet under the roll 14, is sprinkled on its upper surface with the same liquid adhesive via the dispenser 20. The thus treated sheet then proceeds along the conveyer 16 and passes beneath and in contact with the lower surfaces of a series of successive squeeze rollers 24, here shown as four in number. The rollers 24 are open grid or ribbed rollers, as indicated at 25, which press the liquid resin into the resilient sheet 10 in a series of up and down motions, whereby the resilient sheet 10 locally compresses and relaxes, to permit absorption of the resin into the sheet 10, but such rolls do not allow any significant lateral movement of the resin from the deposited locations of the resin on sheet 10, and prevent local buildup of resin and assures uniformity of resin impregnation into sheet 10. The amount of liquid resin which is applied to and is thus impregnated into the foam sheet 10 is such that the sheet is not fully impregnated and hence only partially impregnated with resin, that is, not all of the cells of the foam sheet are filled with resin, and a substantial number of open cells remain in the foam sheet, especially adjacent the center thereof.

The sponge carrier or polyurethane foam sheet 10 is impregnated with the liquid resin system at room temperature, and immediately, i.e. in a matter of a few seconds, passes over rolls 26 into and through a rapid chill chamber 28, where the resin impregnated sheet, now indicated as 10', is chilled to a sufficiently reduced temperature to arrest or substantially prevent polymerization or hardening of the resin. Such chilling in the case of a thermosetting liquid polyurethane resin can suitably be carried out at temperature, e.g. of about 40° F. (+4° C.). The resulting sheet containing the chilled resin is then wound on a roll 30 within a portable cold storage container 32 for storing the roll 33 of chilled resin impregnated sheet 10' and maintaining it in this condition until ready for use at the appropriate bonding site.

Thus, a continuous process is provided for applying and impregnating a liquid resin system into the polyurethane foam sheet, passing the resin impregnated sheet into a chill chamber and winding the latter sheet into a roll for storage. As result of the immediate chilling and cold storage of the resin impregnated sheet, no B-staging of the resin adhesive is carried out, and the resin during the chilling and cold storage of the resin impregnated sheet, is essentially in its initial unreacted condition as when in liquid form. The resulting chilled resin impregnated sheet can be stored, e.g. up to two days at 40° F., but can be stored at substantially lower temperatures for longer periods of time, e.g. for 4 weeks at 0° F.

The amount of liquid resin adhesive impregnated into the open-cell polyurethane foam sheet 10 is controlled so as to accomplish bonding of objects without extrusion of any excess resin during the bonding operation and without attempting to impregnate the materials or objects being bonded together. Thus, as previously noted, the sponge carrier or foam sheet 10 is only partially impregnated with resin. The amount of liquid resin applied to the foam sheet is controlled by metering a specified amount of liquid resin via dispensers 18 and 20, employing suitable conventional metering devices, in relation to the speed of travel of the foam sheet along conveyor 16. In this respect it has been found that the amount of liquid adhesive resin impregnated into the sponge carrier or polyurethane foam sheet will generally vary in relation to the nature of the objects to be bonded together, particularly in order to obtain a strong bond at cryogenic temperatures. Thus, for example, for bonding fiber reinforced polyurethane foam blocks to plywood, a thinner bondline and hence a smaller amount of adhesive resin per square foot is required, as compared to bonding fiber reinforced polyurethane foam blocks to metals such as steel ship hulls, since for example such steel hulls generally have surface irregularities such as weld seams and plate steps which must be accomodated within the adhesive bondlines.

When used for bonding according to the invention, a portion of the chilled sheet 10' impregnated with the uncured resin, is cut to the required size or pattern for application to the surfaces of objects to be bonded, such as blocks of fiber reinforced foam polyurethane, or between such blocks and, for example, plywood or steel surfaces such as the hull of a ship. When the chilled resin impregnated sheet is applied to such objects for bonding, the impregnated resin again becomes liquid as the temperature of the sheet approaches and reaches ambient temperature, and with or without pressure, curing of the resin is permitted to take place at ambient temperature, forming a tough substantially rigid resinous bond between the adjacent object surfaces. During bonding, even under application of a modest pressure of the order of about 10 to about 12 psi whereby the resin impregnated foam sheet can be compressed substantially, e.g. from a thickness of about 0.25" down to as little as 0.015" thick, substantially no resin exudes from the sheet since the sheet is only partially impregnated with resin. The resulting bond formed after curing is substantially solid resin, the foam sheet carrier only constituting about 3 to 4% by weight of the bond or bondline. The resin bondline can vary in physical properties, depending on the nature of the resin. Where the preferred polyurethane resin is used, the cured resin bondline can be in the nature of hard rubber and where an epoxy resin is used, a harder more rigid bondline is obtained.

The invention concept employing the chilled resin impregnated sponge carrier, or open-cell polyurethane foam sheet 10", is particularly designed for use and compatibility for the bonding of blocks of foam insulation together, or to other surfaces such as plywood and metal, in large LNG marine tankers, e.g. as described in U.S. Pat. No. 3,814,275. Thus, referring to FIG. 2 of the drawing, according to one embodiment, the chilled resin impregnated sheet 10', cut to the required size, is positioned between blocks 34 of fiber reinforced foam insulation, for bonding same. The polyurethane foam blocks 34 consists of a matrix of closed-cell polyurethane foam 36 having X, Y and Z reinforcing fibers 38, 40 and 42, extending longitudinally, transversely and depthwise, respectively, in the polyurethane foam body 36. Such fibers have exposed fiber ends, which are preferably tufted, to facilitate bonding of the reinforced polyurethane blocks to each other or to other structural members as noted below. The fibers are preferably glass reinforcing fibers. These blocks may be of the type disclosed in U.S. Pat. No. 3,322,868 to Kruse and Rossello, and are termed herein B 3-D (three dimensional) foam blocks.

When the chilled resin impregnated polyurethane bonding sheet 10' is positioned between the 3-D foam insulation blocks 34, upon increase of the temperature of the sponge carrier adhesive bonding sheet 10' to ambient temperature, the resin in sheet 10' again becomes liquid and then in a short period of time at ambient temperature the resin cures, bonding the polyurethane blocks 34 together through the resulting adhesive bondline at 10a. A high strength bond between the polyurethane blocks 34 is achieved particularly by the fibers such as 42 protruding from the surfaces of the 3-D foam insulation blocks. Bonding can be accomplished while applying only contact pressure between the blocks 34 or light vacuum bag pressure of the order of about 10 to about 12 psi.

As previously noted, according to the invention concept, the open-cell foam sheet 10 functions as the carrier for the resin adhesive. It is the adhesive which functions to bond the adjoining surfaces of the polyurethane foam blocks 34, and following curing, the carrier sheet 10 becomes a part of the resulting adhesive bondline, indicated at 10a, between the blocks 34, but for all practical purposes, following curing of the resin to produce such bondline, the carrier sheet 10 functions as though not even present. The urethane foam carrier thus constitutes only a very minor proportion, e.g. about 3½%, of the overall weight of the adhesive bondline 10a. Since as noted above, the amount of liquid resin impregnated in the foam carrier or polyurethane open-cell sheet 10 is only sufficient so that even upon the application of modest contact pressure of the order of 10 to 12psi between the objects being bonded, no excess resin is extruded from the resin impregnated sheet 10' into the closed-cell polyurethane foam blocks 34.

Referring to FIG. 3 of the drawing, according to another embodiment, the sponge carrier adhesive or resin impregnated polyurethane foam sheet 10' is employed to bond blocks of 3-D closed-cell polyurethane foam 34 to plywood blocks 44. In the embodiment of FIG. 4, the resin impregnated polyurethane foam sheet 10' is employed to bond blocks of 3-D foam insulation 34 to steel plates 46, e.g. in bonding 3-D foam insulation to the steel hull of an LNG tanker. In both of the embodiments of FIGS. 3 and 4, bonding of 3-D foam blocks 34 to the plywood blocks 44, and 3-D foam insulation blocks 34 to the steel plates 46, the same bonding procedure is employed as described above with respect to the embodiment of FIG. 2.

Referring now to FIG. 5 of the drawing, for bonding 3-D polyurethane foam insulation blocks or planks 34 to the inner steel surface of the hold of an LNG tanker, the roll 33 of chilled resin impregnated sheet 10' is sent directly to the work area within the hold 50 of an LNG tanker. Here workmen on a scaffold 52 unroll the roll of chilled resin impregnated sheet 33, and temporarily secure the chilled unrolled resin impregnated sheet 10' to the vertical inner surface 54 of the ship's hull, by suitable means such as clips (not shown). The sheet 10' is unrolled just above the highest row of 3-D polyurethane blocks 34 previously bonded to the inner surface 54 of the ship's hull according to the invention process. Another similar roll 33' of chilled resin impregnated sheet 10', of the desired width, is unrolled and applied over the upper edge 56 of the highest row of 3-D foam blocks 34 previously bonded to the wall 54 of the ship's hull, as indicated at 10'a in FIG. 6.

Now referring to FIG. 6, as soon as the chilled resin impregnated sheets 10' and 10'a have been applied as indicated above, 3-D polyurethane foam insulation blocks similar to 34, and indicated at 34', are positioned by the workmen edgewise on the sheet 10'aof resin impregnated foam sheet on the upper edge 56 of the previously applied foam blocks 34, and are placed vertically against the sheet 10' of resin impregnated foam sheet clipped to the wall of the ship's hold. The foam blocks 34' are maintained by light contact pressure or vacuum bag pressure of about 10 psi, against the resin impregnated sheets 10' and 10'a for a period sufficient to permit the temperature of the chilled resin impregnated sheets 10' and 10'a to attain room temperature and for the resin in such sheets to liquefy and cure at about room temperature, to thereby securely bond the foam blocks 34' to the upper edge 56 of the lower row of foam insulation blocks 34 and to the inner surface 54 of the ship's hull.

In the above described manner, additional vertical rows of 3-D polyurethane foam insulation blocks are applied to the ship's hull to provide a complete layer of 3-D polyurethane foam insulation on the hull of the ship.

As previously noted, the amount of resin adhesive employed varies with respect to the nature of the object to be bonded. Thus, for bonding 3-D polyurethane foam surfaces together to obtain a strong bond at cryogenic temperatures, a 0.1" thick bondline is preferred, utilizing 300 grams of liquid adhesive resin per square foot of surface area; and for bonding 3-D polyurethane foam to plywood, an adhesive bondline of 0.015" thick is preferred, utilizing only 45 grams of liquid adhesive resin per square foot. When adhering 3-D polyurethane foam blocks to steel, a 0.050" thick adhesive bondline is preferred, using 150 grams liquid resin per square foot of surface area.

It will be understood that various types of objects can be adhesively bonded according to the invention concept, in addition to those illustrated by the embodiments of FIGS. 2 to 4. Thus, for example, wood objects can be adhesively secured together or steel objects adhesively bonded together, employing the invention principles and process.

Further, although the process described above and illustrated in FIG. 1 shows application of the liquid adhesive to the open-cell polyurethane foam sheet 10 by spraying or sprinkling the liquid adhesive onto the opposite surfaces of the sheet, the liquid resin adhesive can be applied to the sheet 10 as by dipping or any other suitable means to suitably impregnate the liquid resin in the sheet.

Thus, according to the invention, a controlled amount of liquid adhesive per square foot of bondline area is deposited onto the open-cell flexible foam sheet, and the adhesive is then forced into the flexible foam to achieve a uniform bondline thickness control which is essential to cryogenic insulation bonding. The work life of the catalyzed room temperature curing adhesive impregnated into the flexible foam sheet is prolonged by the above noted chilling operation and the chilled sheet, when required, is transferred to the surfaces to be bonded, and bonding achieved essentially simply by increase of the temperature of the chilled sheet to ambient temperature. Generally the thickness of the sponge carrier or flexible open-cell foam sheet with which the resin is impregnated should not exceed about 0.25" in order to facilitate the chilling process.

From the foregoing, it is seen that according to the invention, a relatively simple and efficient process is provided for bonding the surfaces of objects, and particularly for ambient temperature curing which is essential for bonding foam insulation inside large LNG vessels. This is accomplished readily and with a minimum of expense, labor and the avoidance of cleanup operations inherent to the use of liquid resin adhesives, by impregnating a flexible open-cell foam carrier sheet with a controlled amount of a liquid thermosetting ambient temperature curing resin system, chilling the thus impregnated carrier in a few seconds, and when ready for use, applying the chilled resin impregnated foam carrier sheet, cut to the desired shape and size, between objects such as blocks of polyurethane foam insulation, or between blocks of polyurethane foam insulation and the hull of an LNG tanker, and with or without the application of pressure, permitting the liquid adhesive when it again achieves room temperature, to harden and bond the adjacent surfaces of the objects, without the application of any substantial pressure, and without extrusion of excessive adhesive, forming a high strength bond, particularly at cryogenic temperatures, wherein the sponge carrier or foam sheet becomes an integral part of the resulting bondline.

Since various changes and modifications of the invention will occur to and can be made readily by those skilled in the art without departing from the invention concept, the invention is not to be taken as limited except by the scope of the appended claims.

What is claimed is:

1. Adhesive bonding process which comprises impregnating a sponge carrier with a predetermined amount of a liquid polymerizable resin system which is capable of curing at ambient temperature, quickly reducing the temperature of said resin impregnated sponge carrier sufficiently to arrest the curing of said resin system, maintaining said resin impregnated sponge carrier at said reduced temperature for a period of time, placing at least a portion of said last mentioned sponge carrier impregnated with resin between objects to be bonded together, permitting the temperature of said resin impregnated sponge carrier to rise approximately to ambient temperature, causing the resin system to cure and to bond the adjacent surfaces of said objects, substantially without extrusion of any excess of said resin system from the resin impregnated sponge carrier, the resulting sponge carrier containing cured resin forming the bondline between said bonded objects.

2. The process as defined in claim 1, wherein a light bonding pressure is applied to said objects containing therebetween said resin impregnated sponge carrier during said curing of said resin system, and compressing said resin impregnated sponge carrier.

3. The process as defined in claim 1, wherein said resin impregnated sponge carrier at said reduced temperature is stored prior to placing same between said objects to be bonded together.

4. The process as defined in claim 1, wherein said resin impregnated sponge carrier is maintained at reduced temperature ranging from about 0° F. to about 40° F., prior to placing same between said objects to be bonded.

5. The process as defined in claim 1, said sponge carrier being an open-cell flexible foam sheet.

6. The process as defined in claim 1, said sponge carrier being an open-cell resilient polyurethane foam sheet.

7. The process as defined in claim 1, wherein said resin system comprises a liquid resin selected from the group consisting of liquid polyurethane, polyester, epoxy, melamine and silicone resins, and an ambient temperature curing agent.

8. The process as defined in claim 6, wherein said resin system comprises a liquid resin selected from the group consisting of liquid polyurethane, polyester, epoxy, melamine and silicone resins, and an ambient temperature curing agent.

9. The process as defined in claim 6, said resin system comprising a liquid polyurethane resin and an ambient temperature curing agent.

10. The process as defined in claim 1, said objects being plastic, wood or metal.

11. The process as defined in claim 8, said objects being fiber reinforced foam insulation blocks, plywood or steel.

12. The process as defined in claim 9, said objects being fiber reinforced foam insulation blocks which are bonded together through said bondline.

13. The process as defined in claim 9, said objects being fiber reinforced foam insulation blocks which are bonded to plywood through said bondline.

14. The process as defined in claim 9, said objects being fiber reinforced foam insulation blocks which are bonded to steel through said bondline.

15. The process as defined in claim 1, the thickness of said bondline ranging from about 0.005" to about 0.2".

16. The process as defined in claim 1, said impregnating comprising sprinkling with or dipping into said liquid resin system.

17. The process as defined in claim 1, said impregnating being carried out by sprinkling said sponge carrier with said liquid resin system and applying rollers to said sponge carrier to uniformly disperse said liquid resin system throughout said sponge carrier.

18. Adhesive bonding process which comprises partially impregnating an open-cell resilient polyurethane foam sheet with a predetermined amount of a liquid thermosetting resin capable of curing at ambient temperature and containing an ambient temperature curing agent, said liquid resin selected from the group consisting of polyurethane, polyester and epoxy resin, quickly chilling said resin impregnated foam sheet to maintain said resin in the uncured condition, storing said resin impregnated foam sheet while maintaining said sheet chilled to prevent curing of said resin during said storing, placing at least a portion of said uncured resin impregnated foam sheet between the surfaces of objects to be bonded together, permitting the temperature of said resin impregnated foam sheet to rise approximately to ambient temperature, causing the resin in said foam sheet to revert to a liquid and to cure at ambient temperature, and bonding said objects together through the bondline formed by said foam sheet containing cured resin, substantially without extrusion of any excess resin from said foam sheet.

19. The process as defined in claim 18, wherein only contact pressure is applied to said objects containing therebetween said resin impregnated foam sheet during said curing of said resin.

20. The process as defined in claim 18, wherein only light pressure of the order of about 10 psi is applied to said objects containing therebetween said resin impregnated foam sheet during said curing of said resin, and compressing said resin impregnated polyurethane foam sheet.

21. The process as defined in claim 18, wherein said resin impregnated foam sheet is maintained at temperature ranging from about 0° F. to about 40° F. to prevent curing of said resin.

22. The process as defined in claim 18, said impregnating being carried out by sprinkling the opposite surfaces of said foam sheet with said liquid resin system and applying rollers to the surface of said foam sheet to uniformly disperse said liquid resin in said foam sheet.

23. The process as defined in claim 18, wherein said resin is a polyurethane resin.

24. The process as defined in claim 18, said objects being fiber reinforced foam insulation blocks which are bonded together through said bondline.

25. The process as defined in claim 23, said objects being three-dimensional fiberglass reinforced closed-cell polyurethane insulation blocks which are bonded together through said bondline.

26. The process as defined in claim 23, said objects being fiber reinforced foam insulation blocks which are bonded to plywood through said bondline.

27. The process as defined in claim 23, said objects being fiber reinforced foam insulation blocks which are bonded to steel through said bondline.

28. In an adhesive bonding process employing a sponge carrier containing an uncured resin system capable of curing at ambient temperature, and maintained at a temperature sufficiently low to prevent curing of said resin system, which comprises placing at least a portion of said last mentioned sponge carrier impregnated with resin between objects to be bonded together, permitting the temperature of said resin impregnated sponge carrier to rise approximately to ambient temperature, causing the resin system to cure and to bond the adjacent surfaces of said objects, substantially without extrusion of any excess of said resin system from the resin impregnated sponge carrier, the resulting sponge carrier containing cured resin forming the bondline between said bonded objects.

29. The process as defined in claim 28, wherein a light bonding pressure is applied to said objects containing therebetween said resin impregnated sponge carrier during said curing of said resin system.

30. The process as defined in claim 28, wherein said sponge carrier is an open-cell resilient polyurethane foam sheet, and said liquid resin system contains a resin selected from the group consisting of polyurethane, polyester and epoxy resins, and an ambient temperature curing agent.

31. The process as defined in claim 30, wherein said foam sheet containing said liquid resin system is maintained at temperature ranging from about 0° to about 40° F. prior to placing said sponge carrier between said objects, and said liquid resin is a polyurethane resin.

32. The process as defined in claim 30, said objects being fiber reinforced foam insulation blocks which are bonded together through said bondline.

33. The process as defined in claim 30, said objects being fiber reinforced foam insulation blocks which are bonded to plywood through said bondline.

34. The process as defined in claim 30, said objects being fiber reinforced foam insulation blocks which are bonded to steel through said bondline.

35. An adhesive bonding process which comprises continuously sprinkling the opposite surfaces of an open-cell resilient polyurethane foam sheet with a predetermined amount of a liquid thermosetting resin capable of curing at ambient temperature and containing an ambient temperature curing agent, said liquid resin selected from the group consisting of polyurethane, polyester and epoxy resins, continuously contacting a surface of said treated foam sheet with a series of successive rollers for impregnating said polyurethane foam sheet with said liquid resin, quickly passing the resulting resin impregnated foam sheet continuously through a chill chamber for rapidly chilling said sheet to prevent curing of said resin, storing said resin impregnated foam sheet in a cold storage container at sufficiently low temperature to prevent curing of said resin during said storing, placing a portion of said resin impregnated foam sheet between the surfaces of objects to be bonded together, permitting the temperature of said resin impregnated foam sheet to rise approximately to ambient temperature, causing the resin in said foam sheet to revert to a liquid and to cure at ambient temperature, and bonding said objects together through the bondline formed by said foam sheet containing said cured resin, substantially without extrusion of any excess resin from said foam sheet.

36. The process as defined in claim 35, said rollers being open grid or ribbed rollers which do not allow any significant lateral movement of said resin from the deposited locations of said resin on said sheet.

37. The process as defined in claim 35, the amount of said liquid resin employed being such as to only partially impregnate said foam sheet with said resin, leaving a substantial number of open cells in said foam sheet, and wherein said resin impregnated foam sheet is initially chilled and maintained during storage at temperature ranging from about 0° F. to about 40° F.

38. The process as defined in claim 35, wherein said liquid resin is a liquid polyurethane resin.

39. The process as defined in claim 35, said sprinkling said liquid resin including first continuously sprinkling the bottom surface of said foam sheet, and then continuously sprinkling the upper surface of said foam sheet with liquid resin, and passing said foam sheet over a conveyer, said rollers contacting the upper surface of said foam sheet with light pressure to impregnate said liquid resin into said foam sheet.

40. The process as defined in claim 38, the objects to be bonded together being three-dimensional glass fiber reinforced polyurethane foam insulation blocks and the steel hull inner surface of a liquid natural gas tanker.

* * * * *